United States Patent
Miller

(10) Patent No.: US 7,271,132 B2
(45) Date of Patent: *Sep. 18, 2007

(54) METALLIC SOAPS OF MODIFIED FATTY ACIDS AND ROSIN ACIDS AND METHODS OF MAKING AND USING SAME

(75) Inventor: Jeffrey J. Miller, Tomball, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 415 days.

This patent is subject to a terminal disclaimer.

(21) Appl. No.: 10/794,107

(22) Filed: Mar. 5, 2004

(65) Prior Publication Data

US 2004/0171498 A1    Sep. 2, 2004

Related U.S. Application Data

(63) Continuation-in-part of application No. 10/611,009, filed on Jul. 1, 2003, now Pat. No. 7,008,907, which is a continuation-in-part of application No. 09/999,799, filed on Oct. 31, 2001, now Pat. No. 6,620,770.

(51) Int. Cl.
    *C09K 8/32* (2006.01)
(52) U.S. Cl. ...................... 507/137; 507/138
(58) Field of Classification Search ............ None
    See application file for complete search history.

(56) References Cited

U.S. PATENT DOCUMENTS

| | | | |
|---|---|---|---|
| 2,816,073 A | 12/1957 | Stratton | |
| 3,684,012 A | 8/1972 | Scheffel et al. | |
| 3,878,117 A | 4/1975 | Williams et al. | |
| 3,912,683 A | 10/1975 | O'Farrell | |
| 3,933,780 A * | 1/1976 | Ward | 252/367.1 |
| 3,954,627 A | 5/1976 | Dreher et al. | |
| 4,007,149 A | 2/1977 | Burton et al. | |
| 4,012,329 A | 3/1977 | Hayes et al. | |
| 4,081,462 A * | 3/1978 | Powers et al. | 562/509 |
| 4,148,821 A | 4/1979 | Nussbaum et al. | |
| 4,153,588 A | 5/1979 | Makowski et al. | |
| 4,390,474 A | 6/1983 | Nussbaum et al. | |
| 4,425,462 A | 1/1984 | Turner et al. | |
| 4,447,338 A | 5/1984 | Almond | |
| 4,460,484 A * | 7/1984 | Force | 507/238 |
| 4,488,975 A | 12/1984 | Almond | |
| 4,508,628 A | 4/1985 | Walker et al. | |
| 4,552,215 A | 11/1985 | Almond et al. | |
| 4,553,601 A | 11/1985 | Almond et al. | |
| 4,658,036 A * | 4/1987 | Schilling | 548/513 |
| 4,671,883 A | 6/1987 | Connell et al. | |
| 4,787,990 A | 11/1988 | Boyd | |
| 4,802,998 A | 2/1989 | Mueller et al. | |
| 4,810,355 A | 3/1989 | Hopkins | |
| 4,900,456 A | 2/1990 | Ogilvy | |
| 4,927,669 A * | 5/1990 | Knox et al. | 427/239 |
| 4,964,615 A | 10/1990 | Mueller et al. | |
| 5,045,219 A | 9/1991 | Trahan et al. | |
| 5,053,534 A | 10/1991 | Cosgrove | |
| 5,096,883 A | 3/1992 | Mercer et al. | |
| 5,106,516 A | 4/1992 | Mueller et al. | |
| 5,182,326 A | 1/1993 | LeBlanc et al. | |
| 5,189,012 A | 2/1993 | Patel et al. | |
| 5,194,640 A | 3/1993 | Cosgrove | |
| 5,232,910 A | 8/1993 | Mueller et al. | |
| 5,237,080 A | 8/1993 | Daute et al. | |
| 5,252,531 A | 10/1993 | Mueller et al. | |
| 5,252,554 A | 10/1993 | Mueller et al. | |
| 5,254,531 A | 10/1993 | Mueller et al. | |
| 5,260,268 A * | 11/1993 | Forsberg et al. | 507/133 |
| 5,308,401 A | 5/1994 | Geke et al. | |
| 5,318,954 A | 6/1994 | Mueller et al. | |
| 5,318,955 A | 6/1994 | Mueller et al. | |
| 5,318,956 A | 6/1994 | Mueller et al. | |
| 5,330,662 A | 7/1994 | Jahnke et al. | |
| 5,333,698 A | 8/1994 | Van Slyke | |
| 5,403,508 A | 4/1995 | Reng et al. | |

(Continued)

FOREIGN PATENT DOCUMENTS

AU    B-75043/94    3/1995

(Continued)

OTHER PUBLICATIONS

Foreign communication from a related counterpart application dated Jun. 6, 2005.

P.A. Boyd, D. L. Whitfill, T.S. Carter, J.P. Allamon, New Base Oil Used in Low-Toxicity Oil Muds, SPE 12119, pp. 139-146 (Jan. 1985).

J. E. Friedheim, Second Generation Synthetic Drilling Fluids, Journal Petroleum Technology, pp. 724-728 (Jul. 1997).

SHELL Chemicals Product Data Sheet on NEODOL 23-6.5, Primary Alcohol Ethoxylate (2 pages), no date available.

Chapter 13, Synthetics, Baroid Handbook, Rev. Aug. 1, 1997, pp. 13-1-13-27.

PCT International Search Report and Written Opinion of the International Searching Authority for PCT/GB2006000056, filed Jan. 9, 2006.

*Primary Examiner*—Philip C. Tucker
(74) *Attorney, Agent, or Firm*—Craig W. Roddy; Karen B. Tripp

(57) ABSTRACT

A superior powder form of a metallic soap for enhancing the properties of an invert emulsion drilling fluid may be prepared by a dry process saponification reaction. The process includes mixing a source of metal cations with the product of a Diels-Alder reaction of dienophiles with fatty acids and/or resin acids and allowing the mixture to react. Heating the mixture increases the rate of reaction. The solid product is ground to form a powder. The properties of the drilling fluid that may be improved by adding the soap include filtration control, fluid loss control, emulsification and emulsion stability, and electrical stability.

3 Claims, No Drawings

U.S. PATENT DOCUMENTS

| | | |
|---|---|---|
| 5,403,822 A | 4/1995 | Mueller et al. |
| 5,432,152 A | 7/1995 | Dawson et al. |
| 5,441,927 A | 8/1995 | Mueller et al. |
| 5,498,596 A | 3/1996 | Ashjian et al. |
| 5,508,258 A | 4/1996 | Mueller et al. |
| 5,569,642 A | 10/1996 | Lin |
| 5,589,442 A | 12/1996 | Gee et al. |
| 5,593,954 A * | 1/1997 | Malchow, Jr. .............. 507/135 |
| 5,607,901 A | 3/1997 | Toups, Jr. et al. |
| 5,635,457 A | 6/1997 | Van Slyke |
| 5,744,677 A | 4/1998 | Wu |
| 5,837,655 A | 11/1998 | Halliday et al. |
| 5,846,913 A | 12/1998 | Sawdon |
| 5,849,974 A | 12/1998 | Clarembeau et al. |
| RE36,066 E | 1/1999 | Mueller et al. |
| 5,869,434 A | 2/1999 | Mueller et al. |
| 5,877,378 A | 3/1999 | Overstreet et al. |
| 5,909,779 A | 6/1999 | Patel et al. |
| 5,929,297 A | 7/1999 | Theriot et al. |
| 5,958,845 A | 9/1999 | Van Slyke |
| 6,001,790 A | 12/1999 | Schmitt et al. |
| 6,022,833 A | 2/2000 | Mueller et al. |
| 6,034,037 A | 3/2000 | Van Slyke |
| 6,090,754 A | 7/2000 | Chan et al. |
| 6,107,255 A | 8/2000 | Van Slyke |
| 6,110,874 A | 8/2000 | Van Slyke |
| 6,165,946 A | 12/2000 | Mueller et al. |
| 6,180,572 B1 | 1/2001 | Mueller et al. |
| 6,211,119 B1 | 4/2001 | Herold et al. |
| 6,620,770 B1 * | 9/2003 | Kirsner et al. .............. 507/131 |
| 7,008,907 B2 * | 3/2006 | Kirsner et al. .............. 507/137 |
| 2004/0059032 A1 | 3/2004 | He |
| 2004/0171727 A1 | 9/2004 | Winters et al. |
| 2005/0037929 A1 | 2/2005 | Kirsner |

FOREIGN PATENT DOCUMENTS

| | | |
|---|---|---|
| DE | 196 43 840 A1 | 5/1998 |
| EP | 0 247 801 B1 | 12/1987 |
| EP | 0254 412 B1 | 1/1988 |
| EP | 0 124 194 B1 | 3/1988 |
| EP | 0 561 608 A3 | 9/1999 |
| EP | 1 424 380 A1 | 6/2004 |
| EP | 1424380 A1 | 6/2004 |
| EP | 1 496 096 A2 | 1/2005 |
| GB | 1020711 | 4/1966 |
| GB | 2 212 192 A | 7/1989 |
| GB | 2 287 052 A | 9/1995 |
| GB | 2 309 240 A | 7/1997 |
| WO | WO83/02949 A1 | 9/1983 |
| WO | WO93/23491 A1 | 11/1993 |
| WO | WO94/16030 A1 | 7/1994 |
| WO | WO95/06694 | 3/1995 |
| WO | WO95/09215 A1 | 4/1995 |
| WO | WO95/21225 A1 | 8/1995 |
| WO | WO98/18882 A1 | 5/1998 |
| WO | WO99/50370 A1 | 10/1999 |
| WO | WO 00/71241 A1 | 11/2000 |
| WO | WO 03/038008 A1 | 5/2003 |

* cited by examiner

METALLIC SOAPS OF MODIFIED FATTY ACIDS AND ROSIN ACIDS AND METHODS OF MAKING AND USING SAME

RELATED APPLICATIONS

This application is a continuation-in-part of U.S. patent application Ser. No. 10/611,009, filed Jul. 1, 2003, issued as U.S. Pat. No. 7,008,907 on Mar. 7, 2006, which is a continuation-in-part of U.S. patent application Ser. No. 09/999,799, filed Oct. 31, 2001, issued as U.S. Pat. No. 6,620,770 on Sep. 16, 2003.

BACKGROUND OF THE INVENTION

1. Field of the Invention

The present invention relates to methods for drilling boreholes in subterranean formations, particularly hydrocarbon bearing formations, and to drilling fluids for use in such drilling operations. Particularly, the present invention relates to oil or synthetic based drilling fluids, fluids comprising invert emulsions, and more particularly drilling fluid additives that facilitate or enhance emulsification, electrical stability or filtration properties of the drilling fluid. Additionally, the present invention relates to methods or processes for making such additives.

2. Description of Relevant Art

A drilling fluid or mud is a specially designed fluid that is circulated through a wellbore as the wellbore is being drilled to facilitate the drilling operation. The various functions of a drilling fluid include removing drill cuttings from the wellbore, cooling and lubricated the drill bit, aiding in support of the drill pipe and drill bit, and providing a hydrostatic head to maintain the integrity of the wellbore walls and prevent well blowouts. Specific drilling fluid systems are selected to optimize a drilling operation in accordance with the characteristics of a particular geological formation.

Oil or synthetic-based muds, or invert emulsion muds or fluids, are normally used to drill swelling or sloughing shales, salt, gypsum, anhydrite or other evaporate formations, hydrogen sulfide-containing formations, and hot (greater than about 300° F.) holes, but may be used on other holes penetrating a subterranean formation as well. These non-aqueous based drilling fluids typically contain oil or a synthetic oil or other synthetic material or synthetic fluid as the continuous phase and may also contain water which is dispersed in the continuous phase by emulsification so that there is no distinct layer of water in the fluid. The term "oil mud" or "oil or synthetic-based mud" typically means an invert oil mud emulsion or invert emulsion. An all oil mud simply comprises 100% oil by volume as the liquid phase; that is, there is no aqueous internal phase. An invert emulsion drilling fluid may commonly comprise between about 50:50 to about 95:5 by volume oil phase to water phase.

Most commonly, invert emulsions used in drilling typically comprise: a base oil or synthetic fluid for the external phase; a saline, aqueous solution for the internal phase (typically a solution comprising about 30% calcium chloride); and other agents or additives for suspension, fluid loss, density, oil-wetting, emulsification, filtration, and rheology control. With space at some well sites limited, such as on offshore platforms, and with increasing costs of transport of materials to a wellsite, there is industry-wide interest in, and an on-going need for, more efficient and concentrated drilling fluid additives and for drilling fluids which can be formulated and maintained with minimal or fewer additives than common with prior art drilling fluids.

SUMMARY OF THE INVENTION

An improved and more efficient material or product and methods for making and using the product are disclosed for improving the properties of invert emulsions and other oil or synthetic based drilling fluids for use in drilling boreholes in subterranean formations, particularly hydrocarbon bearing formations. The drilling fluid properties that may be improved by adding the product of the invention include, without limitation, filtration control, fluid loss control, emulsification and emulsion stability, and/or electrical stability.

The product of the invention has the advantage of preferably existing in a stable dry powder form for ease of storage and transport while having excellent solubility in invert emulsion or other oil or synthetic-based drilling fluids.

The product of the invention is a metallic soap prepared according to the process of the invention. That process is a dry process for saponifying a Diels-Alder reaction product, from dienophiles and fatty acids, resin acids or preferably mixtures thereof, with metal oxides and/or metal hydroxides, preferably calcium hydroxide or lime. Preferably, the Diels-Alder reaction product is blended with a polyamide, most preferably a carboxylic acid terminated polyamide, prior to the saponification. In the dry process, the Diels-Alder product or blend is preferably mixed with enough oxide to theoretically or stoichiometrically complete the saponification reaction, and is most preferably mixed with at least about twice the amount of oxide stoichiometrically needed to neutralize the acid value of the Diels-Alder product or blend. Heat may be applied to increase the rate of the reaction. The reaction product, a solid, is preferably ground into a powder. The presence of any excess oxide in the powder may help keep the powder from consolidating during storage or transport. Inert filler may optionally be added to the powder for this purpose as well.

A method for drilling a borehole in a subterranean formation using a drilling fluid containing the product of the invention is also disclosed.

DESCRIPTION OF PREFERRED EMBODIMENTS

U.S. Pat. No. 6,620,770, issued Sep. 16, 2003 to Jeff Kirsner, Jeff Miller and Jon Bracken, and incorporated entirely herein by reference, and U.S. patent application Ser. No. 10/611,009, of Jeff Kirsner, Jeff Miller, and Jon Bracken, filed Jul. 1, 2003, also incorporated entirely herein by reference, teach a drilling fluid additive comprising a blend, mixture, or combination (hereinafter "blend") of: (1) a carboxylic acid-terminated polyamide and/or wetting agent ("Component A"); and (2) a mixture or reaction product ("Component B") produced by the Diels-Alder reaction of dienophiles, preferably carboxylic acids, polycarboxylic acids, and anhydrides, or combinations or mixes thereof, with a mixture of fatty acids and resin acids. Component B has a ratio of fatty acids to resin acids preferably ranging from about 4:1 to about 1:1 and a most preferred ratio of about 2:1 and is preferably comprised of fatty acids and resin acids derived from the distillation of crude tall oil. Tall oil is a commonly known product made from acid treatment of alkaline liquors obtained from the manufacture of wood pulp.

When a carboxylic acid terminated amide is used as Component A, it is preferably concentrated (i.e., about 90% active), and typically made from the condensation reaction between fatty acids and polyamines. The fatty acids and polyamines are reacted in such proportion as to create a "partial amide" intermediate product having a mole ratio of the reactive acid sites to amine sites ranging from about 0.5:1 to about 0.75:1 and most preferably about 0.6:1. This partial amide intermediate product is diluted with a minimum amount of solvent, as needed for further processing, and the remaining amine sites are further reacted with an acid anhydride or polycarboxylic acid to produce the carboxylic acid-terminated polyamide. A most preferred carboxylic acid-terminated fatty polyamide is EZ-MUL®NT CONCENTRATE, the active constituent of EZ-MUL®NT available from Halliburton Energy Services, Inc. in Houston, Tex., although other carboxylic acid terminated fatty polyamides may be used.

Any wetting agent that provides a wetting function in a drilling fluid and preferably that is environmentally acceptable for use in a drilling fluid may be substituted for, or added to, the carboxylic acid terminated amide as Component A in the blend. Examples of such wetting agents include, without limitation, quaternary ammonium salt, lecithin, and sodium dodecylbenzene sulfonate.

In comprising the blend of Component A and Component B, the preferred ratio of Component A to Component B is about 1:5 to about 1:1. Ratios of Component A to Component B of about 1:2 to about 1:3 are most preferred. The exact ratio of these two components or parts may vary greatly depending on the exact desired characteristics of the product. Preferably, however, the quantity of Component B will exceed the quantity of Component A.

The blend of Component A and Component B is preferably made by blending, mixing, or combining these two components the polyamide and/or wetting agent, and the Diels-Alder modified fatty acid/resin acid mixture or reaction product-together. After blending, the polyamide and/or wetting agent, and the fatty acid/resin acid components, are reacted with cations to form soaps. The polyamide (if present) may undergo some saponification along with or as well as the fatty acid/resin acids.

According to U.S. Pat. No. 6,620,770, issued Sep. 16, 2003 to Jeff Kirsner, Jeff Miller and Jon Bracken, and U.S. patent application Ser. No. 10/611,009, of Jeff Kirsner, Jeff Miller and Jon Bracken, filed Jul. 1, 2003, such blending and saponification may be achieved as part of the manufacturing process of the product or may be effected in situ the drilling fluid by the presence or addition of cations to the drilling fluid. Calcium cations are preferred and may be obtained, for example, by reacting the modified fatty acid/resin acid component with lime, quicklime, or calcium chloride. The blending in the drilling fluid may occur when the drilling fluid is prepared, when the drilling fluid is at the well surface, or after the drilling fluid has been pumped into the wellbore. When blending in the wellbore, the components may be added to the drilling fluid separately or together. The blend product made by blending in the drilling fluid is a liquid advantageously having a pour point at temperatures as low as about 20° F. with minimal solvent.

According to the present invention, even further advantages can be realized when the saponification is conducted by a dry reaction yielding a solid material—a metallic soap—that can be ground into a stable, dry powder. According to this dry reaction process of the present invention, the polyamide and modified fatty acids/resin acids blend is mixed with calcium hydroxide or lime (or other metal oxide or metal hydroxide) until the mixture is preferably homogeneous and allowed to react. Heat may be applied to expedite initiation of the reaction and/or to increase the rate of reaction. The reaction is exothermic and will create its own heat after initiation. Enough calcium hydroxide or lime should preferably be used to react at least theoretically completely with the blend. Most preferably, at least about twice the amount of oxide stoichiometrically needed to neutralize the acid value of the blend is used. The activity of metal oxide varies with the grade and process used in making the oxide, causing the amount of oxide needed for the saponification reaction to be imprecise. Generally, the more oxide used the better, depending on the characteristics of the drilling fluid, and subject to any desire to limit the amount of excess oxide considering any effect the excess may have on the pH of the drilling fluid system. Excess, i.e., unreacted, oxide may act as a filler and can be helpful in preventing consolidation or re-consolidation of the product when in powder form. Fillers (preferably inert), such as, for example, calcium carbonate, kaolin, zeolite, bentonite and/or other inert clay minerals, may be added before, during, or after the reaction, to facilitate complete mixing of the reactants or complete grinding of the product, particularly in commercial manufacturing operations, and also to help prevent consolidation or reconsolidation of the powder product.

The dry reaction process of the invention yields a stoichiometrically less accurate or less complete reaction than the classical method of saponification. The classical method of saponification generally involves three steps and if used for the blend is generally conducted as follows: (1) first, the hydrophobic fatty acid-containing blend is dissolved in water by heating and neutralizing with sodium or potassium hydroxide to form a water-soluble soap; (2) once the mixture is completely neutralized, a calcium salt such as calcium chloride is added to effect cation exchange—the divalent calcium ions replace monovalent sodium or potassium ions to yield a water-insoluble calcium soap—; and (3) next, the soap material is washed with fresh water to remove residual salt and dried to form a solid material that can be ground into a dry powder. In the dry reaction process of the invention, a small amount of hydrophobic raw material remains in the dry powder. This subtle difference is believed to produce the advantages of the present invention.

A blend of an acid terminated polyamide and a mixture of products from a Diels-Alder reaction of dienophiles with fatty acids and resin acids reacted with calcium hydroxide (or lime) in the dry process to form a calcium soap product according to the present invention eliminates the need for treatment with lime at the well site to effect in situ saponification. That is, instead of an acidic liquid added to the drilling fluid for in situ saponification with lime, for example, a metallic soap of the present invention may be employed. This consequent reduction in the need to add pH basic materials (such as lime, for example) to the drilling fluid with the product prepared according to the process of the invention —the product of the present invention—is particularly advantageous with drilling fluids comprising esters of fatty acids, as such basic materials can initiate ester hydrolysis and alter the characteristics of the drilling fluid.

Further, the process of the invention eliminates the need for drums as packaging material for the product, resulting in reduced costs and improved ease of handling. Additionally, the product, as a powder, is not temperature sensitive and is usable at any temperature likely to be encountered in drilling for oil or gas. The product of the invention is particularly advantageous at colder temperatures where a liquid may become too thick for pouring into drilling fluids.

Moreover, the product of the invention provides superior properties to oil or synthetic based drilling fluids, as demonstrated by the experiments reported in the Tables below.

The product of the invention is a powerfully efficient additive for oil or synthetic based drilling fluids, affording or effecting enhanced emulsification, and improved electrical stability and fluid loss control, with significantly less volume of additive than previously known or available with prior art drilling fluid additives. Although a dry powder, the product of the invention has excellent solubility in oil and synthetic based drilling fluids and quickly becomes active in such fluids to effect improved properties in the fluids.

The product of the invention effects or helps facilitate emulsification typically in amounts of about one-third the quantity commonly needed for emulsification of oil or synthetic based fluids with prior art emulsifiers. That is, amounts of about three pounds to about five pounds of the product of the invention per barrel of drilling fluid can be effective for emulsification. Even lower quantities can improve the electrical stability and filtration control of drilling fluids, even if already emulsified with other emulsifiers.

The product of the invention does not rely on a carrier. The material comprising the product of the invention is highly active and is believed to be useful with all or substantially all synthetic and oil-based systems known to be effective for drilling fluids. The product of the invention may also add viscosity to the drilling fluid and thus is preferably added to the base drilling fluid before any weighting agents such as barite, for example, are added.

Drilling fluids containing the product of the invention are stable even at temperatures up to (and including) about 300° F. without filtration additives and up to about 350° F. with filtration additives. Combining a wetting agent with a carboxylic acid-terminated polyamide as Component A may improve the Theological stability. Using both a wetting agent and a carboxylic acid terminated amide as Component A, along with Component B, to comprise the product of the invention in an emulsifier package may also improve the oil-wetting nature of the drilling fluid in some base oils or synthetics and/or at certain reservoir conditions. For example, in a hostile or difficult offshore environment, a particular drilling fluid comprising the product of the invention might show enhanced performance upon addition of a wetting agent to the product of the invention, or more particularly or preferably to Component A, while the same drilling fluid in a different environment might show no improvement upon such addition of wetting agent.

For some environments, Component B may be saponified and used without blending with Component A at all or Component A may be added to the drilling fluid separately from saponified Component B. Polyamide provides a good Component A because it provides wetting and tolerates the saponification reaction treatment when combined with Component B and can itself get saponified. However, other materials that provide wetting could be substituted for Component A in the blend or used instead of Component A and added separately to the drilling fluid.

Care is recommended when using the product of this invention to avoid over-treating (i.e., adding too much of the product). Excess emulsifiers (i.e., more than needed to effect emulsification) in drilling fluids can contribute to high fluid viscosity at cold temperatures (i.e., temperatures less than about 45° F.). For deepwater operations (i.e., use of drilling fluids at depths of water greater than about 1000 feet and at temperatures less than about 45° F.), a wetting agent may preferably be used as Component A or added when Component A is a carboxylic acid-terminated amide to help maintain low riser viscosities as drill solids are incorporated in or become carried by the drilling fluid.

Although the polyamide and modified fatty acids/resin acids blend is used in the experiments reported in the Tables below and is generally or typically preferred, some advantages of the invention may be realized with some other materials. That is, numerous other acidic materials could be processed to metallic soaps according to the dry process of the invention. For example, a Diels-Alder reaction of dienophiles with fatty acids may be converted to metallic soaps according to the dry process of the invention without the acid terminated poly amide (or other Component A material) and without the resin acids. The resin acids are believed to impart some enhanced properties to the drilling fluids, however, that may be not be achieved to the same degree if at all without them. Generally, any metal oxides, hydroxides or combinations thereof might be used to effect the saponification of any acid terminated polyamides and Diels-Alder reaction products from dienophiles and fatty acids, resin acids, or mixtures thereof, according to the dry process of the invention.

The method of the invention comprises adding the product of the invention to an oil or synthetic based drilling fluid or employing a drilling fluid comprising the product of the invention in drilling a borehole in a subterranean formation. In another embodiment, the method of the invention comprises adding the product of the invention to an oil or synthetic based drilling fluid to facilitate emulsification of the drilling fluid or the formation of invert emulsions. In still another embodiment, the method of the invention comprises adding the product of the invention to an oil or synthetic based drilling fluid to enhance one or more properties of the fluid such as filtration control, fluid loss control, electrical stability, and emulsion stabilization.

Experiments were conducted that demonstrate or exemplify the invention. In the experiments reported below in Table 1, four drilling fluid samples were formulated using soaps made with different saponification techniques and identical amounts of other components to compare the difference the different saponification techniques made on the effects that the soaps imparted to the properties of the drilling fluid. The drilling fluid was an oil based fluid commonly used commercially by the oil industry in drilling boreholes in subterranean formations. The soaps were each made with a polyamide and modified fatty acids/resin acids blend, BDF 333 blend, available from Halliburton Energy Services, Inc. in Houston, Tex.

In Sample 1, lime and the blend were added separately to the drilling fluid for in situ saponification. In Sample 2, the blend was saponified according to the dry reaction process of the present invention but using the same amount of lime as used in Sample 1 and the resulting dry powder was added to the drilling fluid. In Sample 3, the blend was saponified according to the dry reaction process of the present invention using a greater quantity of lime than used for Samples 1 or 2 and the resulting dry powder was added to the drilling fluid. In Sample 4, the blend was saponified according to the classical method of saponification and the resulting dry powder was added to the drilling fluid.

As shown in Table 1, Sample 3, prepared according to the dry reaction process of the present invention, with a preferred or at least a greater amount of lime than used with Samples 1 and 2, had the best or most improved properties. The filtration properties of Samples 1 and 2, with the same amount of lime used for each, were comparable to each other. Sample 2 (dry product) had more stable rheological properties after hot rolling at 300° F. than Sample 1. Sample 4 showed the worst or least improved properties overall.

In the experiments reported in Table 2, three drilling fluid samples were formulated using a synthetic invert emulsion fluid base comprising olefins and esters of fatty acids. To avoid initiation of ester hydrolysis in such a system, excess alkalinity should not be present at elevated temperatures (temperatures above about 300° F.). The components of the drilling fluid samples were substantially the same except for the amount of lime added, if any. Two samples—Samples 6 and 7—used dry process calcium soaps of the invention and one sample—Sample 5—used soap prepared by adding lime to the drilling fluid for saponification in situ. The soaps in all three samples were made from the polyamide and modified fatty acids/resin acids blend, but less lime was used to effect the saponification with the dry process soaps than was used for saponification of the blend in situ. The amount of the polyamide and modified fatty acids/resin acids blend in each sample was the same. Additional lime was added to Sample 7 so the amount used overall would be equal to that used in Sample 5, although the majority of lime used in Sample 7 was used in the dry process, rather than added to the drilling fluid separately.

As shown in Table 2, Sample 6 had superior properties to Sample 5 before the addition of Rev Dust, which was added to stress the fluids. After the Rev Dust was added, the HTHP filtrate increased, indicating a need for slightly higher alkalinity, i.e., indicating that the lime to blend ratio was not great enough for these conditions. When additional lime was added to Sample 7, the properties of the fluid remained stable even after Rev Dust was added, and showed lower filtration (i.e., better properties) than in Sample 5. Since the base drilling fluid comprised esters, this reduction in the need for and amount of lime to be added to the fluid favorably demonstrates the superiority of using the dry process soap of the invention to the soap prepared in situ.

As previously noted, because excess alkalinity can initiate hydrolysis of esters in a synthetic based drilling fluid comprising esters, there is an advantage in avoiding such hydrolysis by adding a metallic soap to the fluid rather than adding an acidic liquid blend and lime (alkaline) for in situ saponification in the fluid. This advantage which the present invention provides is reflected in Table 2 and is particularly demonstrated in the experiments reported in Table 3.

Similar to the experiments reported in Table 2, in the experiments reported in Table 3 two drilling fluid samples were formulated using a synthetic invert emulsion fluid base comprising olefins and esters of fatty acids. The components of the two samples—Samples 8 and 9—were substantially the same except that a dry process calcium soap of the invention (made from the polyamide and modified fatty acids/resin acids blend saponified with lime) was used in Sample 9 and the polyamide and modified fatty acids/resin acids blend was added to the drilling fluid in Sample 8 separately with lime for saponification in situ the sample. The samples contained the same amount of the blend and the same amount of lime was used for saponification of the blend. The samples were heated to higher temperatures than those used in the experiments reported in Table 2, and were heated for longer time intervals. The amount of alcohol present in the samples was measured as an indication of ester hydrolysis, or break down in esters comprising the drilling fluid base.

Table 3 indicates that the hydrolysis of the esters in the drilling fluid base was remarkably reduced when the soap of the present invention was used (Sample 9), clearly showing an advantage provided by the present invention over known and previously preferred preparation techniques for the additive.

The experiments overall show that not only is the process of the invention efficient, but the metallic soaps made according to the process provide a much preferred dry powder form product with many advantages.

As used in the tables, the following compounds or products have the meanings indicated below:

ESCAID® 110 fluid is an oil based drilling fluid available from ExxonMobil Corp. in Houston, Tex.;

GELTONE® II additive is an organoclay for improving the ability of a drilling fluid to suspend drill cuttings;

BDF 333 blend is a drilling fluid additive comprising a carboxylic acid-terminated polyamide and a mixture or reaction product produced by the Diels-Alder reaction of dienophiles with a mixture of fatty acids and resin acids;

ADAPTA® additive is a drilling fluid additive for high temperature high pressure (HTHP) FILTRATION control;

EZ MUL® NT additive is an emulsifier with a carboxylic acid terminated polyamide;

LE SUPERMUL® additive is an emulsifier with a carboxylic acid terminated polyamide;

ENVIROMUL™ fluid is a paraffin oil based drilling fluid.

BARACARB® additive is a substantially water insoluble inorganic chemical material in dry, granular form for admixture with water or brine to form a weighted suspension;

OMC™ 42 additive is a thinner and wetting agent;

BAROID® barite is a weighting agent; and

Rev Dust is material used to simulate drill solids.

All trademarks are the property of Halliburton Energy Services, Inc. and the products are available from Halliburton Energy Services, Inc. in Houston, Tex., except for ESCAID® II which is a trademark of ExxonMobil Corporation in Irving, Tex.

TABLE 1

14.0 lb/gal Oil Based Drilling Fluid
80/20 Oil-to-Water Ratio with 250,000 ppm $CaCl_2$ Water Phase Salinity

|  | Sample | | | |
| --- | --- | --- | --- | --- |
|  | 1 | 2 | 3 | 4 |
| ESCAID ® 110 fluid, bbl | 0.550 | 0.550 | 0.550 | 0.552 |
| Freshwater, bbl | 0.066 | 0.065 | 0.065 | 0.065 |
| GELTONE ® II additive, bbl | 7 | 7 | 7 | 7 |
| 11.6 lb/gal $CaCl_2$, bbl | 0.093 | 0.091 | 0.091 | 0.091 |
| BDF 333 ™ blend, lb | 4 | — | — | — |

TABLE 1-continued 14.0 lb/gal Oil Based Drilling Fluid
80/20 Oil-to-Water Ratio with 250,000 ppm $CaCl_2$ Water Phase Salinity

| | Sample 1 | | Sample 2 | | Sample 3 | | Sample 4 | |
|---|---|---|---|---|---|---|---|---|
| Lime, lb | 1.2 | | — | | — | | — | |
| BDF 333 ™ calcium soap A, lb | — | | 5.5 | | — | | — | |
| BDF 333 ™ calcium soap B, lb | — | | — | | 5.5 | | — | |
| BDF 333 ™ calcium soap C, lb | — | | — | | — | | 4.6 | |
| ADAPTA ® HP additive, lb | 1.25 | | 1.25 | | 1.25 | | 1.25 | |
| EZ MUL ® NT additive, lb | 8 | | 8 | | 8 | | 8 | |
| BAROID ® weighting agent, lb | 326 | | 327 | | 327 | | 327 | |
| Rev Dust, lb | 20 | | 20 | | 20 | | 20 | |
| Lime-to-BDF-333 Ratio | 0.30 | | 0.30 | | 0.43 | | N/A | |
| Mixed on Hamilton-Beach blender, minutes | 15 | | 15 | | 15 | | 15 | |
| Hot rolled @ 300° F., hr. | — | 16 | — | 16 | — | 16 | — | 16 |
| Plastic Viscosity @ 120° F., cP | 30 | 36 | 26 | 36 | 28 | 36 | 26 | 36 |
| Yield Point, lb/100 ft² | 23 | 9 | 19 | 14 | 18 | 10 | 15 | 14 |
| 10 Sec gel, lb/100 ft² | 12 | 6 | 10 | 7 | 10 | 7 | 8 | 6 |
| 10 Min gel, lb/100 ft² | 12 | 9 | 10 | 9 | 11 | 14 | 9 | 9 |
| Electrical stability @ 120° F., v | 1001 | 544 | 875 | 553 | 1012 | 540 | 825 | 665 |
| HTHP filtrate @ 300° F., ml oil | 4.2 | 7.0 | 4.4 | 9.0 | 3.2 | 4.4 | 6.2 | 10.0 |
| Water/emulsion in filtrate, ml | — | — | — | — | — | — | — | Trace |
| FANN ® 35 dial readings | | | | | | | | |
| 600 rpm | 83 | 81 | 71 | 86 | 74 | 82 | 67 | 86 |
| 300 rpm | 53 | 45 | 45 | 50 | 46 | 46 | 41 | 50 |
| 200 rpm | 42 | 34 | 36 | 37 | 37 | 34 | 32 | 37 |
| 100 rpm | 30 | 21 | 25 | 23 | 26 | 21 | 22 | 23 |
| 6 rpm | 12 | 6 | 10 | 7 | 10 | 6 | 8 | 6 |
| 3 rpm | 11 | 5 | 9 | 6 | 9 | 5 | 7 | 5 |

Calcium Soap Descriptions (% by mass)
A = Dry process with 22% lime and 4% calcium carbonate filler
B = Pilot dry process production with 30% lime, no filler
C = Classical process, lime was not used

TABLE 2

16 lb/gal Synthetic Invert Emulsion Based Drilling Fluid
80/20 Oil-to-Water Ratio with 250,000 ppm $CaCl_2$ Water Phase Salinity

| | Sample 5 | Sample 6 | Sample 7 |
|---|---|---|---|
| Synthetic Drilling Fluid Base, bbl | 0.4922 | 0.4945 | 0.4945 |
| Freshwater, bbl | 0.0600 | 0.0590 | 0.0590 |
| 11.6 lb/gal $CaCl_2$ brine, bbl | 0.0851 | 0.0835 | 0.0835 |
| BDF 333 ™ blend, lb | 4 | — | — |
| BDF 333 ™ calcium soap A, lb | — | 5.41 (*4.00*)* | 5.41 (*4.00*)* |
| Lime, lb | 2 | — | 0.8 |
| ADAPTA ® HP additive, lb | 2.5 | 2.5 | 2.5 |
| LE SUPERMUL ® additive, lb | 10 | 10 | 10 |
| BAROID ® weighting agent, lb | 430.5 | 429.6 | 429.6 |
| Rev Dust, lb | 20 | 20 | 20 |
| Lime-to-BDF-333 Ratio | 0.50 | 0.30 | 0.50 |

All fluids were sheared on a Silverson for 15 minutes at 7000 rpm**
And hot rolled at 150° F. before testing

| | | | | | | | | |
|---|---|---|---|---|---|---|---|---|
| Additional Rev Dust, lb/bbl | — | — | 44 | — | — | 44 | — | — | 44 |
| Hot Rolled @ 300° F., hr | — | 16 | 16 | — | 16 | 16 | — | 16 | 16 |
| Plastic viscosity @ 120° F., cP | 52 | 54 | 72 | 47 | 50 | 80 | 48 | 56 | 79 |
| Yield point, lb/100 ft² | 16 | 17 | 27 | 22 | 15 | 28 | 24 | 19 | 29 |

TABLE 2-continued 16 lb/gal Synthetic Invert Emulsion Based Drilling Fluid
80/20 Oil-to-Water Ratio with 250,000 ppm CaCl₂ Water Phase Salinity

| | Sample | | | | | | | | |
|---|---|---|---|---|---|---|---|---|---|
| | 5 | | | | | 6 | 7 | | |
| 10 Sec/10 Min gels, lb/100 ft² | 5/8 | 6/8 | 10/12 | 8/9 | 7/8 | 11/13 | 8/9 | 7/8 | 11/14 |
| Electrical stability @ 120° F., v | 1276 | 958 | 353 | 880 | 757 | 333 | 1257 | 982 | 340 |
| HTHP filtrate @ 300° F., ml | 0.8 | 3.0 | 5.4 | 1.8 | 1.8 | 9.4*** | 0.8 | 0.8 | 2.4 |
| FANN ® 35 dial readings | | | | | | | | | |
| 600 rpm | 120 | 125 | 171 | 116 | 115 | 188 | 120 | 131 | 188 |
| 300 rpm | 68 | 71 | 99 | 69 | 65 | 108 | 72 | 75 | 109 |
| 200 rpm | 51 | 52 | 73 | 52 | 48 | 80 | 55 | 56 | 81 |
| 100 rpm | 31 | 32 | 44 | 33 | 30 | 49 | 35 | 35 | 49 |
| 6 rpm | 6 | 7 | 11 | 9 | 7 | 12 | 9 | 9 | 12 |
| 3 rpm | 5 | 6 | 9 | 7 | 6 | 10 | 7 | 7 | 10 |

*The italicized number indicates the equivalent weight of BDF 333 ™ blend added. Some inert filler was present.
**The fluid temperature was regulated at 150-160° F. while shearing.
***The fluid was very thick following the HTHP test, indicating adjusted was likely needed in the alkalinity.

TABLE 3

16 lb/gal Synthetic Invert Emulsion Based
Drilling Fluid - 325° F.
85/15 Oil-to-Water Ratio with 250,000 ppm
CaCl₂ Water Phase Salinity

| Sample | 8 | 9 |
|---|---|---|
| Synthetic Drilling Fluid Base, bbl | 0.511 | 0.514 |
| Freshwater, bbl | 0.048 | 0.047 |
| 11.6 lb/gal Calcium chloride brine, bbl | 0.059 | 0.058 |
| BDF 333 ™ blend, lb | 4 | — |
| BDF 333 ™ calcium soap A, lb | — | 5.47 |
| Lime, lb | 1.2 | — |
| ADAPTA ® HP additive, lb | 3.5 | 3.5 |
| LE SUPERMUL ® additive, lb | 9 | 9 |
| BAROID ® weighting agent, lb | 411 | 411 |
| Rev Dust, lb | 40 | 40 |
| BARACARB ™ 25 additive, lb | 10 | 10 |
| OMC ™ 42 additive, lb | 0.5 | 0.5 |
| All fluids were sheared on a Silverson L4RT for 15 minutes at 8000 rpm* and hot rolled at 150° F. for 4 hours. | | |
| Hot Rolled @ 325° F., hours | 64 | 64 |
| Samples were stirred 15 minutes on a Multimixer before testing | | |
| Plastic viscosity @ 150° F., cP | 50 / 59 | 48 / 60 |
| Yield point, lb/100 ft² | 16 / 17 | 13 / 19 |
| 10 Sec/10 Min gels, lb/100 ft² | 6/10 / 6/9 | 4/8 / 7/11 |
| Electrical stability @ 150° F., v | 754 / 475 | 614 / 483 |
| HTHP filtrate @ 325° F., ml | 8.8 / 13.6 | 9.6 / 12.8 |
| FANN ® 35 dial readings | | |
| 600 rpm | 116 / 135 | 109 / 139 |
| 300 rpm | 66 / 76 | 61 / 79 |
| 200 rpm | 48 / 55 | 44 / 58 |
| 100 rpm | 29 / 33 | 26 / 35 |
| 6 rpm | 6 / 7 | 5 / 7 |
| 3 rpm | 4 / 5 | 3 / 5 |
| Equivalent Lime-to-BDF-333 Ratio | 0.30 | 0.30 |
| ALCOHOL, % wt by GC/MSD | — / 5.77 | — / 1.86 |

*The fluid temperature was kept below 195° F. with a cold water bath.

The foregoing description of the invention is intended to be a description of preferred embodiments. Various changes in the details of the described fluids and methods of use can be made without departing from the intended scope of this invention as defined by the appended claims.

What is claimed is:

1. A method for drilling a borehole in a subterranean formation employing a drilling fluid, said method comprising adding to said fluid a metallic soap prepared according to a method comprising saponifying a blend of a polyamide and a mixture produced by the Diels-Alder reaction of dienophiles with a material selected from the group consisting of fatty acids, resin acids, and mixtures thereof, by a dry process employing a source of metal cations.

2. A method for drilling a borehole in a subterranean formation employing a drilling fluid containing a drilling fluid additive comprising a metallic soap prepared by a process comprising:
   (a) blending an acid terminated polyamide and a mixture produced by the Diels-Alder reaction of dienophiles with acids selected from the group consisting of fatty acids, modified fatty acid, resin acids, and mixtures thereof;
   (b) adding to said blend a source of metal cations selected from the group of materials consisting of metal oxides, metal hydroxides, and mixtures thereof;
   (c) allowing said blend to react with said metal cations; and
   (d) recovering the solid reaction product.

3. A method for enhancing one or more properties of an oil or synthetic based drilling fluid by adding to said fluid a metallic soap prepared according to a method comprising saponifying a mixture produced by the Diels-Alder reaction of dienophiles with a material selected from the group consisting of fatty acids, resin acids, and mixtures thereof, by a dry process employing a source of metal cations.

* * * * *